Aug. 21, 1928.
J. E. HOWELL
FISHHOOK
Filed July 22, 1927
1,681,407
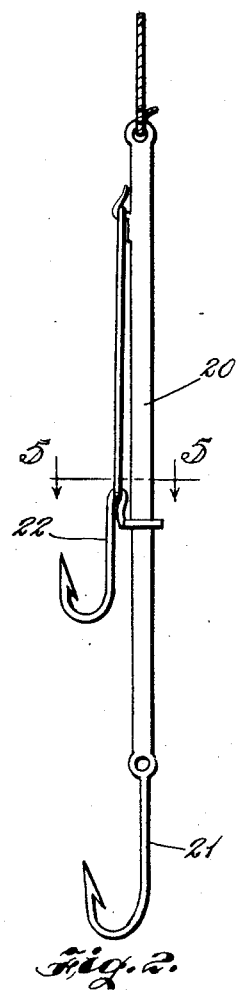
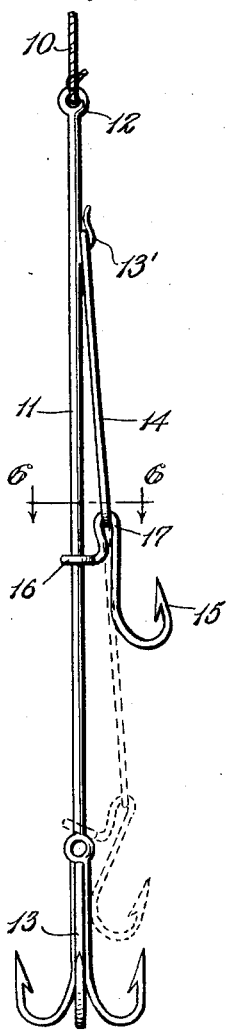
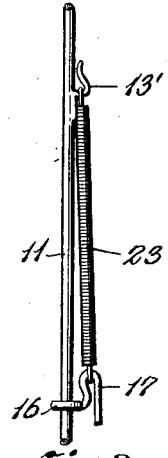
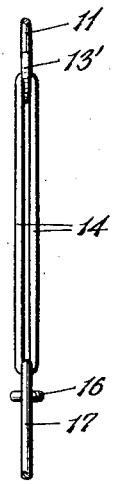
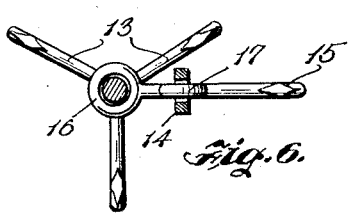
J. E. Howell,
INVENTOR
BY John M. Spellman
ATTORNEY Patented Aug. 21, 1928.

1,681,407

UNITED STATES PATENT OFFICE.

JOHN E. HOWELL, OF DALLAS, TEXAS.

FISHHOOK.

Application filed July 22, 1927. Serial No. 207,669.

The invention relates to fish hooks, and more particularly to that type of hook known as a trap hook, in which a pilot hook is employed for holding the bait to attract the fish, the pilot hook being associated with another hook or hooks in such a manner that when the fish pulls upon the pilot hook it will be immediately caught securely by the other hook or hooks in such a manner that it is impossible for the fish to get away. I am aware that devices of this general character are known, but it is the object of the present invention to simplify and improve upon devices heretofore known to the art.

The invention will be more fully understood by reference to the accompanying drawing, in which:—

Fig. 1 is a side elevation showing a preferred form of the invention.

Fig. 2 is a similar view showing a modification.

Fig. 3 is a fragmentary view showing a third modification.

Fig. 4 is a detail front elevation of the form of device shown in Fig. 1.

Fig. 5 is a section on line 5—5 of Fig. 2, and

Fig. 6 is a section on line 6—6 of Fig. 1.

In the drawing, referring first to Figs. 1 and 6, the reference numeral 10 denotes a fragmentary portion of a line, and the numeral 11 denoted the metal shank of the combination hook unit, the shank being provided with an eye 12 for attachment of the line 10. At the lower end of the shank is a cluster of hooks 13, which may be termed the "impaling unit" as these hooks are used to impale or firmly secure the fish after it has been attracted by the bait on a suitable pilot hook.

Intermediate the ends of the shank 11 and nearer the upper end thereof, is formed a "hitch" or hook 13' which is designed to removably support a resilient fastening such as the elastic 14 which serves to normally hold a pilot hook 15 in the upper position shown in full lines on the drawing. The pilot hook 15 is provided with an eye 16 through which passes the shank 11 of the combined unit, and intermediate the hook portion and the eye the shank of the pilot hook is bent as at 17 in order to receive the resilient connector 14. The bend 17 and the hitch 13' are made small enough so that it requires some pressure to insert the elastic, so that there is no danger of its slipping off unintentionally, yet at the same time permitting the replacement of the elastic in case it is broken, or for any other reason. The replaceable feature of the elastic is one of the important elements of my invention.

The operation of the device will be evident from the foregoing description. The pilot hook 15 is baited in any suitable manner, and as soon as the fish takes hold of the pilot, the jerk of the angler or the pull of the fish causes the pilot hook 15 and the impaling unit 13 to approach each other, and to thereby securely engage the fish upon the lower hooks. It will be noted that the steel shank 11 serves as a rigid guide for the eye of the pilot hook, and that there is very little friction and no danger of breakage, as would be the case if the pilot travelled upon the line as in previous constructions, instead of upon the metal shank.

Various modifications of the invention may be resorted to without departing from the spirit of my invention. For example, a rectangular shank 20 may be used to guide the pilot hook 22 upon a single impaling lower hook 21 as illustrated in Fig. 2, the rectangular shank insuring direct contact with the lower hook.

If desired, a coil spring or other elastic 23 as shown in Fig. 3 may be substituted for the rubber band, the operation being substantially the same in each case. Other changes may obviously be made without departing from the spirit of the invention as set forth in the accompanying claim.

Having thus described my invention, what I claim as new and desire to secure by Letters Patent is:—

A device of the character described comprising in combination a rigid shank having an impaling fish hook unit at one end thereof, a hitch formed on said shank at a substantial distance from the impaling unit, a pilot hook provided with an eye to reciprocably receive said shank intermediate said hitch and the impaling unit, said pilot hook having its shank bent to form an open loop adjacent said eye and removable resilient means reacting between said pilot hook and said shank for normally holding said pilot hook away from said impaling unit, said loop permitting intentional withdrawal of but preventing accidental separation of said resilient means therefrom.

In testimony whereof I affix my signature.

JOHN E. HOWELL.